Feb. 19, 1935.  J. W. MISNER  1,991,566

MIRROR

Filed June 1, 1934

John W. Misner
Inventor

By C. A. Snow & Co.
Attorneys.

Patented Feb. 19, 1935

1,991,566

UNITED STATES PATENT OFFICE 1,991,566

MIRROR

John W. Misner, West Asheville, N. C.

Application June 1, 1934, Serial No. 728,601

3 Claims. (Cl. 240—4.1)

This invention aims to provide novel means whereby an object located in front of a mirror may be illuminated, so that it can be seen readily in the mirror. Another object of the invention is to provide novel means for mounting the lamp within the casing that forms part of the device. A further object of the invention is to provide novel means for controlling the lamp circuit.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 4:
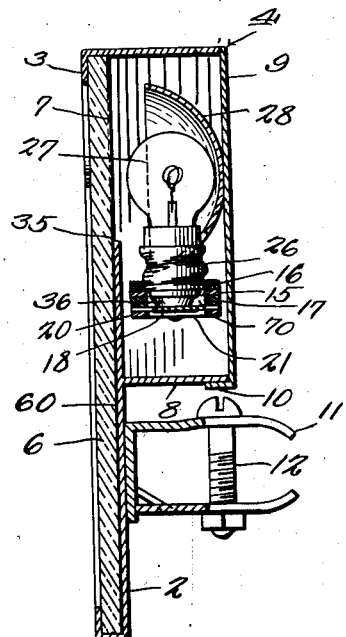
Fig. 4 is a vertical section taken from front to back.
Figure 5:
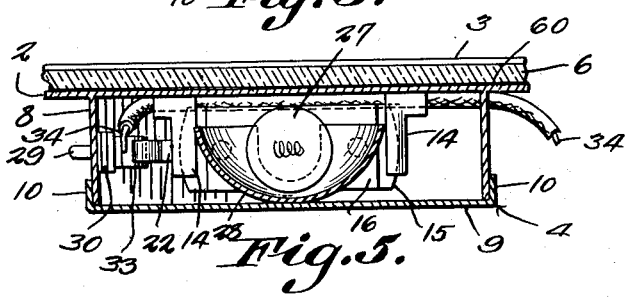
Fig. 5 is a horizontal section.
Figure 6:
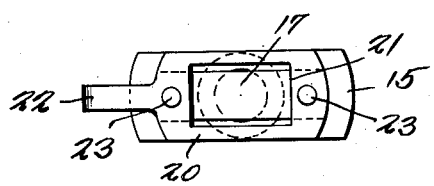
Fig. 6 is a bottom plan showing the carrier plate and parts associated therewith.

The device comprises a frame 1 including a back plate 2, the frame being provided at its front with a marginal, inwardly-projecting flange 3. A mirror 6 is held between the back plate 2 and the flange 3. The mirror 6 has a reflecting surface 60 in which there is an opening 7. The opening 7 extends through the reflecting surface 60 only, and not through the body portion of the mirror 6. The body 8 of a box-like casing 4 is secured to the back plate 2 of the frame 1. The top of the frame 1 and the top of the box-like body 8 of the casing 4 are prolonged upwardly as shown at 5 to form an extension. The opening 7 in the reflecting surface 60 of the mirror 6 is located, for the most part in this extension. The casing 4 includes a back closure 9, which is removable. Along its lower edge and along its vertical edges, the closure 9 has flanges 10 which engage the body 8 of the casing 4 with a friction grip. As shown at 35 in Fig. 4, the back wall 2 of the frame 1 terminates, within the body 8 of the casing 4, below the opening 7 in the reflecting surface 60 of the mirror 6. The closure 9 for the box-like body 8 carries a reflector 28, located within the casing 4 and behind the opening 7. A clip 11 is mounted on the back plate 2 of the frame 1, below the casing 4 and comprises draw bolts 12, by which the clip 11 may be engaged with any desired part of an automobile or the like, the clip thus holding the device in place.

Figure 1:
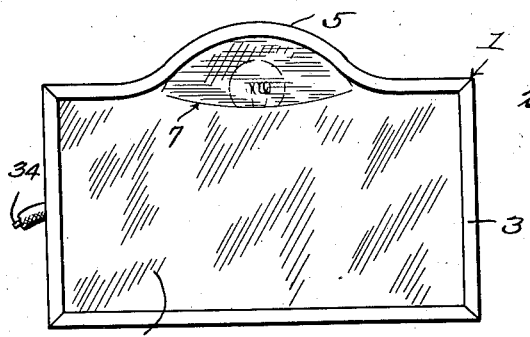
Fig. 1 shows, in front elevation, a device constructed in accordance with the invention.
Figure 2:
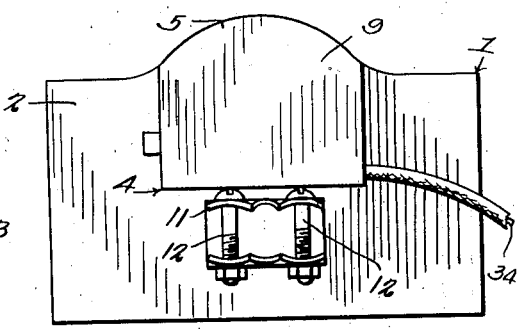
Fig. 2 is a rear elevation.
Figure 3:
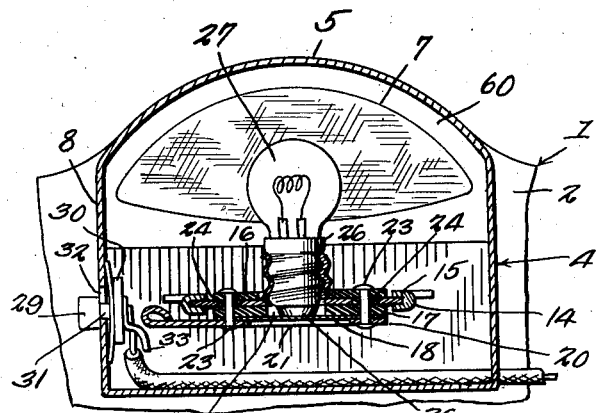
Fig. 3 is a vertical section taken from side to side.

Backwardly-extended retainers or brackets 14 are located in the body 8 of the casing 4. The retainers 14 are U-shaped in cross section (Fig. 3) and are secured to that part of the back plate 2 of the frame 1 which lies within the body 8 of the casing 4. A metal carrier plate 15 is removably mounted at its ends in the retainers 14. An upper insulating strip 16 is disposed on top of the carrier plate 15. A lower insulating strip 17 is disposed on the bottom of the carrier plate 15 and has a hole 70. A resilient conducting plate 18 rests against the lower surface of the lower insulating strip 17 and extends across the hole 70 in the lower insulating strip 17. A switch plate 20 rests against the lower surface of the resilient conducting plate 18. The switch plate 20 has a large central opening 21. At one end, the switch plate 20 has a projecting tongue 22. Securing elements 23 join together the upper insulating strip 16, the carrier plate 15, the lower insulating strip 17, the conducting plate 18 and the switch plate 20. Insulating washers 24 surround the securing elements 23, within the carrier plate 15, so that there is no electrical engagement between the securing elements 23 and the carrier plate 15. A lamp socket 26 is secured to the carrier plate 15. The lamp socket 26 extends upwardly through the upper insulating strip 16. An electric lamp 27 is mounted in the socket 26, between the reflector 28 and the opening 7 in the reflecting surface of the mirror 6. The lamp 27 has an end terminal 36, extended through the hole 70 in the lower insulating strip 17 into engagement with the conducting plate 18.

One end of the body 8 of the casing 4 carries a switch of any desired construction. The switch may comprise an external button 29, an internal foot 30, and a neck 31 connecting the foot and the button. The neck 31 of the switch slides in a slot 32 in one end of the body 8 of the casing 4. The foot 30 of the switch has an inwardly-extended projection 33. A conductor 34 is connected electrically to the projection 33.

By shoving upwardly on the button 29, the projection 33 engages the tongue 22 of the switch plate 20. Then there is established a lamp circuit comprising the conductor 34, the projection 33, the tongue 22, the switch plate 20, the conducting plate 18, the end terminal 36 of the lamp 27, the side terminal of the lamp, the socket 26, the carrier plate 15, the retainers 14, the back plate 2 of the frame 1, and the ground. The lamp 27 is lighted, and shines through the opening 7 in the reflecting surface 60 of the mirror 6, either to furnish illumination, generally, or to illuminate any object which is being viewed in the mirror 6.

Especial attention is directed to the ease with which the carrier plate 15 may be slid out of the retainers 14, when the back closure 9 of the casing 4 is removed, the plate 15 carrying with it not only the lamp 27, but most of the switch parts associated with the lamp. The purpose of the opening 21 in the switch plate 20 is to permit the conducting plate 18 to spring downwardly, under the pressure of the end terminal 36 of the lamp 27.

What is claimed is:

1. A device of the class described comprising a frame including a back plate, a mirror in the front portion of the frame and engaged with the back plate, the mirror having a reflecting surface, a casing including a box-like body of less height than the frame and secured to the back plate, the reflecting surface of the mirror having an opening located within the body, that portion of the back plate which is within the body terminating below the opening, an electric lamp in the body, behind the opening, means mounted on said portion of the back plate for supporting the lamp, a movable back-closure for the body, a reflector carried by the closure and located behind the lamp, and an anchorage means for the device, carried by the back plate and located below the body.

2. A device of the class described comprising a frame including a back plate, a mirror in the front portion of the frame and engaged with the back plate, a casing including a box-like body secured to the back plate, the mirror having an opening located within the body, that portion of the back plate which is within the body terminating below the opening, rearwardly-extended retainers within the body and mounted on said portion of the back plate, a carrier plate having its ends detachably mounted in the retainers, an upper insulating strip mounted on the top of the carrier plate, a lower insulating strip mounted on the bottom of the carrier plate and having a hole, a resilient conducting plate mounted on the bottom of the lower conducting strip extended across the hole, a switch member mounted on the bottom of the conducting plate and having an opening into which the conducting plate can flex, securing elements connecting the upper insulating strip, the carrier plate, the lower insulating strip, the conducting plate and the switch plate, means for insulating the securing elements from the carrier plate, a socket on the carrier plate and extended through the upper insulating strip, a lamp on the socket and having an end terminal which engages the resilient conducting plate, and switch means for closing a circuit through the switch plate, the conducting plate, the end terminal of the lamp, the socket, the carrier plate and the retainers.

3. A device of the class described including a frame having a back plate, a mirror in the front portion of the frame and engaged with the back plate, a casing including a box-like body secured to the back plate, the mirror having an opening located within the body, the portion of the back plate which is within the body terminating below the opening, rearwardly extended retainers within the body and mounted on said portion of the back plate, a carrier plate having its ends slidably and detachably mounted on the retainers, an electric lamp behind the opening, means for mounting the lamp on the carrier plate, switch means for closing a circuit through the lamp, and a movable closure for the back of the casing, the carrier plate being slidably detachable from the retainers, when the closure is opened.

JOHN W. MISNER.